US 8,144,387 B2

(12) United States Patent
Kim et al.

(10) Patent No.: US 8,144,387 B2
(45) Date of Patent: *Mar. 27, 2012

(54) DISPLAY DEVICE (75) Inventors: Sang-Il Kim, Yongin-si (KR);
Nam-Seok Roh, Seongnam-si (KR);
Cheol-Woo Park, Suwon-si (KR);
Kyu-Young Kim, Suwon-si (KR)

(73) Assignee: Samsung Electronics Co., Ltd,
Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/783,997

(22) Filed: May 20, 2010

(65) Prior Publication Data
US 2010/0232009 A1  Sep. 16, 2010

Related U.S. Application Data (63) Continuation of application No. 12/056,842, filed on Mar. 27, 2008, now Pat. No. 7,746,543.

(30) Foreign Application Priority Data

May 21, 2007  (KR) .................. 10-2007-0049193

(51) Int. Cl.
*G02B 26/00* (2006.01)
*G09G 3/34* (2006.01)
(52) U.S. Cl. ...................... 359/296; 345/107
(58) Field of Classification Search .............. 359/296, 359/452, 253; 345/107, 105, 108; 430/32; 204/600
See application file for complete search history.

(56) References Cited

U.S. PATENT DOCUMENTS

| 5,134,081 | A  | 7/1992 | Yamazaki et al. |
| 6,239,896 | B1 | 5/2001 | Ikeda |
| 6,271,823 | B1 | 8/2001 | Gordon, II et al. |
| 6,885,495 | B2 | 4/2005 | Liang et al. |
| 7,023,609 | B2 | 4/2006 | Mizuno |
| 7,046,228 | B2 | 5/2006 | Liang et al. |
| 7,075,502 | B1 | 7/2006 | Drzaic et al. |

(Continued)

FOREIGN PATENT DOCUMENTS

JP  2003-108035  4/2003

(Continued)

OTHER PUBLICATIONS

Office Action dated Oct. 21, 2009 for co-pending U.S. Appl. No. 12/056,842.

(Continued)

*Primary Examiner* — William Choi
(74) *Attorney, Agent, or Firm* — H.C. Park & Associates, PLC (57) ABSTRACT

An electrophoretic display includes a lower substrate, an upper substrate, a color display layer on the lower substrate, a pixel electrode on the lower substrate, and a common electrode on the lower substrate or the upper substrate. The common electrode does not overlap the pixel electrode, and an electrophoretic active layer having a dispersion medium and electrophoretic particles is arranged between the lower substrate and the upper substrate. The electrophoretic active layer is a single-polarity electrophoretic particle system, and grayscales are generated depending on the number of electrophoretic particles arranged in a portion of the electrophoretic active layer corresponding to the pixel electrode. The position of the electrophoretic particles is controlled by the magnitude of the electric field applied between the pixel electrode and the common electrode.

10 Claims, 12 Drawing Sheets

U.S. PATENT DOCUMENTS

| | | | |
|---|---|---|---|
| 7,177,067 | B1 | 2/2007 | Sakamoto |
| 7,492,505 | B2 | 2/2009 | Liang et al. |
| 7,746,543 | B2 * | 6/2010 | Kim et al. .................... 359/296 |
| 2002/0008898 | A1 | 1/2002 | Katase |
| 2003/0117016 | A1 * | 6/2003 | Ukigaya ...................... 305/107 |
| 2003/0214479 | A1 * | 11/2003 | Matsuda et al. ............. 345/107 |
| 2004/0239613 | A1 | 12/2004 | Kishi |
| 2005/0275933 | A1 | 12/2005 | Johnson et al. |
| 2008/0024432 | A1 | 1/2008 | Lee et al. |
| 2008/0204649 | A1 | 8/2008 | Yoshida et al. |

FOREIGN PATENT DOCUMENTS

| | | |
|---|---|---|
| JP | 2004-271610 | 9/2004 |
| JP | 2004-361514 | 12/2004 |
| JP | 2005-275261 | 10/2005 |
| KR | 10-2005-0000680 | 1/2005 |

OTHER PUBLICATIONS

Notice of Allowance dated Feb. 19, 2010 for co-pending U.S. Appl. No. 12/056,842.

* cited by examiner

DISPLAY DEVICE

CROSS-REFERENCE TO RELATED APPLICATION

This application is a continuation of U.S. patent application Ser. No. 12/056,842, filed on Mar. 27, 2008, and claims priority from and the benefit of Korean Patent Application No. 10-2007-0049193, filed on May 21, 2007, which are hereby incorporated by reference for all purposes as if fully set forth herein.

BACKGROUND OF THE INVENTION

1. Field of the Invention

The present invention relates to a display device, and more particularly, to an electrophoretic display.

2. Discussion of the Background

Recently, attention has been drawn to electronic paper that is portable, has the feel of paper, and is easy for display and erasure, as a next generation display. Representative examples of electronic paper include twist ball, an electrophoretic display, and a cholesterol liquid crystal display.

The electrophoretic display may repeatedly display and erase images by using the electrophoretic phenomenon. The electrophoretic phenomenon refers to the movement of charged particles dispersed in a fluid due to an applied electric field An electrophoretic display may include black and white electrophoretic particles or black and colored electrophoretic particles such that desired images may be displayed.

However, response time to display a desired image may be delayed due to the friction between two particles in the electrophoretic display, and since the density of the particles may be small, color reproducibility may be decreased.

SUMMARY OF THE INVENTION

This invention provides an electrophoretic display with reduced response time and improved color reproducibility.

Additional features of the invention will be set forth in the description which follows, and in part will be apparent from the description, or may be learned by practice of the invention.

The present invention discloses an electrophoretic display including a first substrate, a second substrate facing the first substrate, a color display layer arranged on the first substrate, a first electrode arranged on the first substrate, a second electrode arranged on the first substrate or the second substrate but not overlapping the first electrode, and an electrophoretic active layer having electrophoretic particles and a dispersion medium. The electrophoretic particles are arranged between the first substrate and the second substrate. Further, the electrophoretic active layer is a single-polarity electrophoretic particle system.

The present invention also discloses an electrophoretic display including a first substrate, a second substrate facing the first substrate, a reflective color filter layer arranged on the first substrate, a first electrode arranged on the first substrate, a second electrode arranged on the first substrate or the second substrate but not overlapping the first electrode, and an electrophoretic active layer having electrophoretic particles and a dispersion medium. The electrophoretic particles are arranged between the first substrate and the second substrate. Further, the electrophoretic active layer is a single-polarity electrophoretic particle system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Now, an electrophoretic display according to exemplary embodiments of the present invention will be described in detail with the reference to the Drawings.

Figure 1:
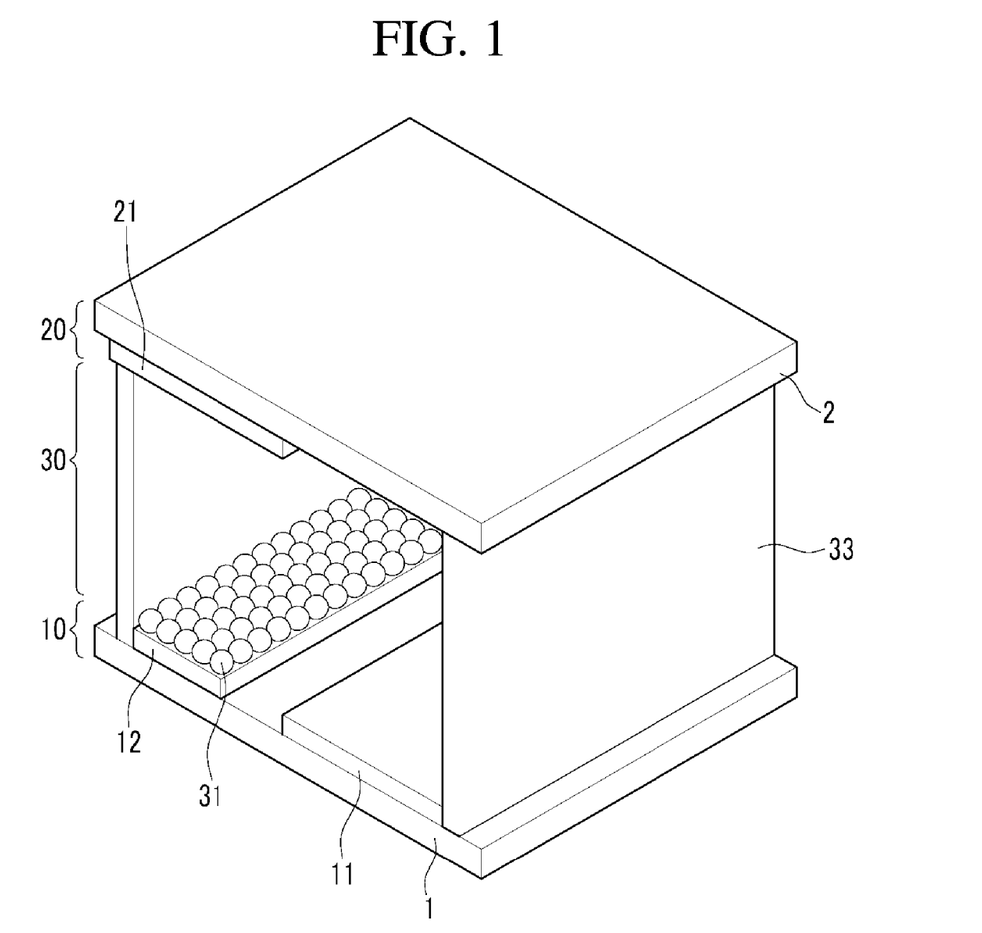
FIG. 1 is a perspective view of an electrophoretic display according to an exemplary embodiment of the present invention.
Figure 2:
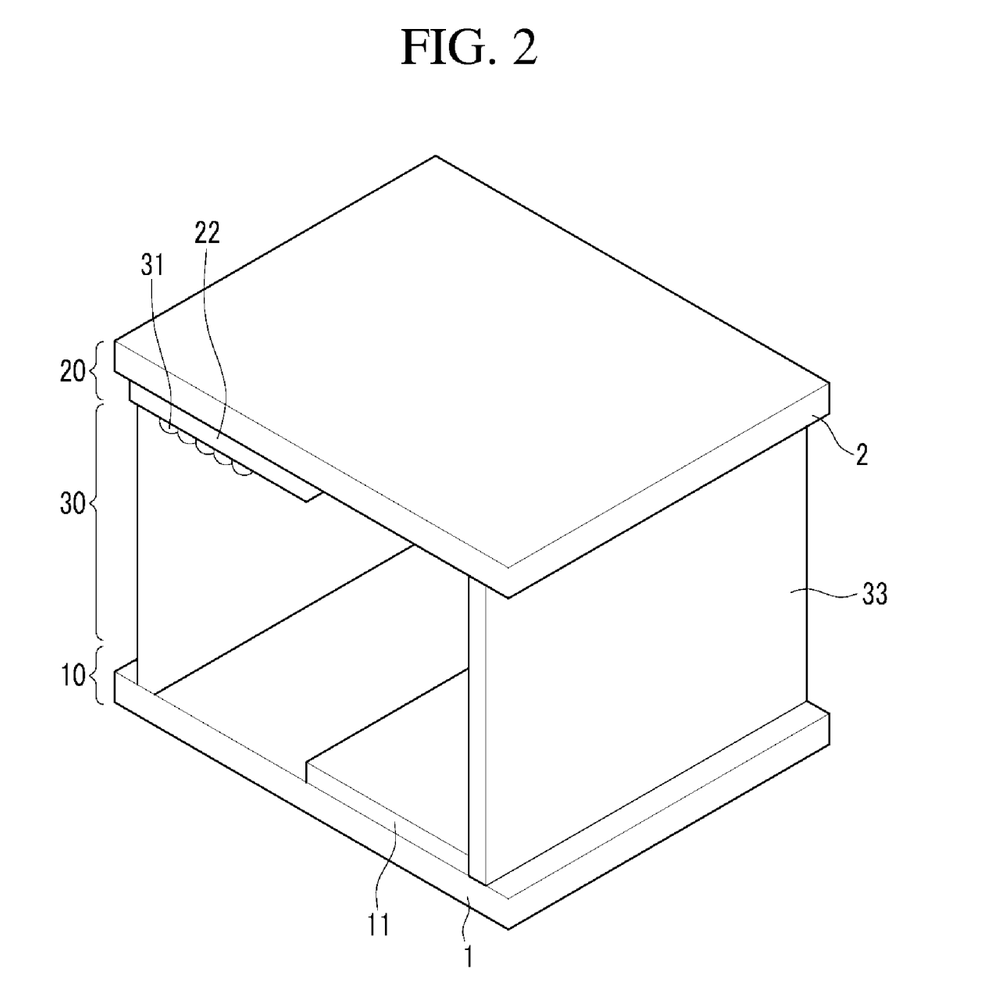
FIG. 2 is a perspective view of an electrophoretic display according to another exemplary embodiment of the present invention.

FIG. 1 is a perspective view of an electrophoretic display according to an exemplary embodiment of the present invention, and FIG. 2 is a perspective view of an electrophoretic display according to another exemplary embodiment of the present invention.

Referring to FIG. 1 and FIG. 2, electrophoretic displays according to exemplary embodiments include a lower panel 10, an upper panel 20, an electrophoretic active layer 30, and a partition 33.

The lower panel 10 and the upper panel 20 are positioned opposite to each other with a gap arranged therebetween, and the electrophoretic active layer 30 is arranged in the gap. The partition 33 is connected to the lower panel 10 and the upper panel 20, and divides and defines the electrophoretic active layer 30.

The electrophoretic active layer 30 includes electrophoretic particles 31 dispersed in a dispersion medium (not shown). The electrophoretic particles 31 may include a charge control agent, and the dispersion medium may include a surfactant agent and a density control agent.

The electrophoretic particles 31 have the same electric polarity. Thus, the electrophoretic particles 31 have a positive polarity, or the electrophoretic particles 31 have a negative polarity. Hereafter, the electrophoretic active layer 30 including the electrophoretic particles 31 having a single polarity is referred to as a "single-polarity electrophoretic particle system."

Referring to FIG. 1, the lower panel 10 includes a substrate 1 and a pair of field generating electrodes 11 and 12 arranged thereon. The upper panel 20 includes a substrate 2 and a light blocking member 21 arranged thereon. The light blocking member 21 blocks light and is disposed in a position corresponding to the field generating electrode 12.

Referring to FIG. 2, the lower panel 10 includes a substrate 1 and a field generating electrode 11 arranged thereon. The upper panel 20 includes a substrate 2 and a field generating electrode 22 arranged thereon. Here, the field generating electrode 22 of the upper panel 20 blocks light such that a separate light blocking member 21 may be excluded.

Referring to FIG. 1 and FIG. 2, light is absorbed or a blocked in a region corresponding to the field generating electrode 11 of the lower panel 10 such that black is displayed, and the electrophoretic particles 31 may reflect the light. The electrophoretic particles 31 may be white, or one of three primary colors. Examples of three primary colors include red, green, and blue, or yellow, cyan, and magenta. The field generating electrode 11 of the lower panel 10 may absorb the light. However, a portion other than the field generating electrode 11, such as a layer below the field generating electrode 11, may absorb the light, in which case the field generating electrode 11 may be a transparent material.

In contrast, the light may be reflected in a region where the field generating electrode 11 of the lower panel 10 is disposed, and electrophoretic particles 31 with black color may absorb or block the light. The reflected light in the region corresponding to the field generating electrode 11 of the lower panel 10 may be white or one of three primary colors. In this case, the field generating electrode 11 of the lower panel 10 may reflect the light. However, a portion other than the field generating electrode 11, such as a layer below the field generating electrode 11, may reflect the light, in which case the field generating electrode 11 may be a transparent material.

Next, operation of an electrophoretic display according to an exemplary embodiment of the present invention will be described in detail with reference to FIG. 3, FIG. 4, FIG. 5, FIG. 6, and FIG. 7. For the purpose of description, the field generating electrode 11 mainly disposed in the effective display area EA will be referred to as an exposed electrode, and the field generating electrode 12 mainly disposed in the blocking region BA will be referred to as a hidden electrode.

Figure 3:
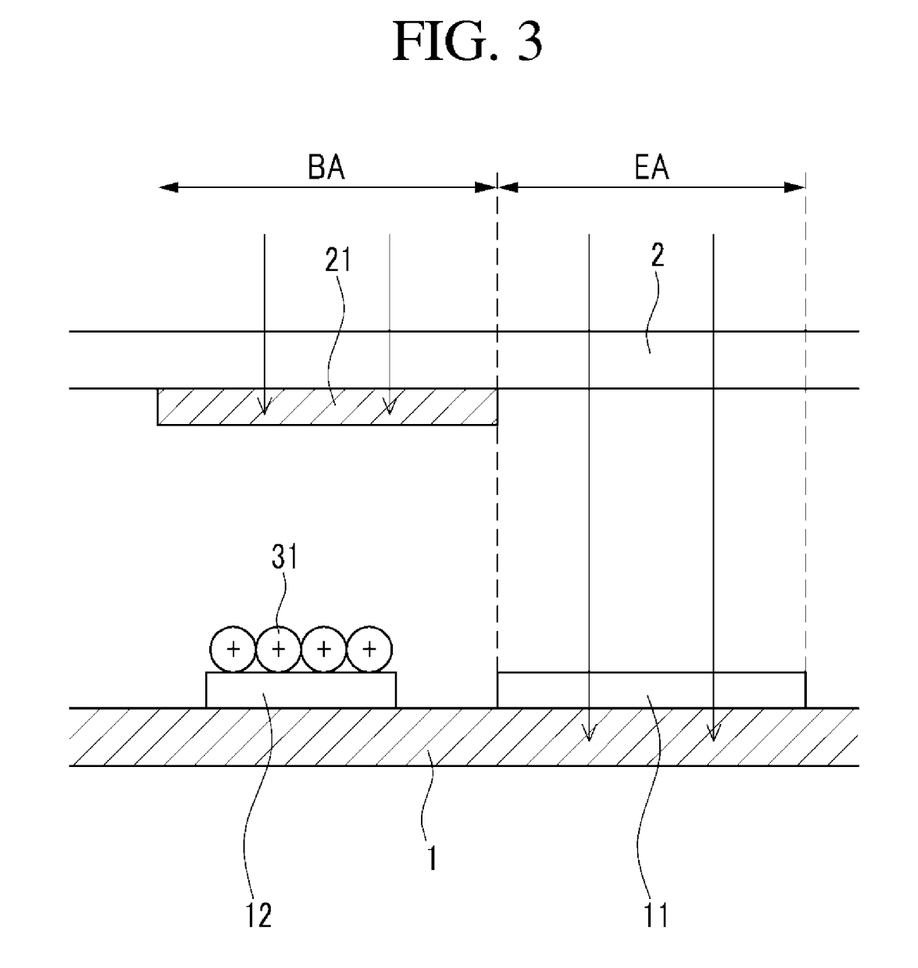
FIG. 3, FIG. 4, FIG. 5, FIG. 6, and FIG. 7 are cross-section views showing the operation of an electrophoretic display according to an exemplary embodiment of the present invention.

Referring to FIG. 3, a region where the light blocking member 21 is disposed may be referred to as a light blocking region BA, and the region outside the light blocking region BA may be referred to as an effective display area EA. Because the light blocking member 21 blocks and/or absorbs the light, the light blocking region displays black.

First, in FIG. 3, FIG. 4, FIG. 5, and FIG. 6, the lower substrate 1 absorbs the light and the exposed electrode 11 is made of a transparent material.

In FIG. 3, because a voltage difference is not generated between the exposed electrode 11 and the hidden electrode 12, an electric field is not generated between the exposed electrode 11 and the hidden electrode 12. Thus, the electrophoretic particles 31 are disposed in the light blocking region BA. Then, the external light incident from the side of the upper panel 20 is absorbed by the substrate 1 in the effective display area EA such that a black color is displayed in the effective display area EA and the light blocking region BA.

Figure 4:
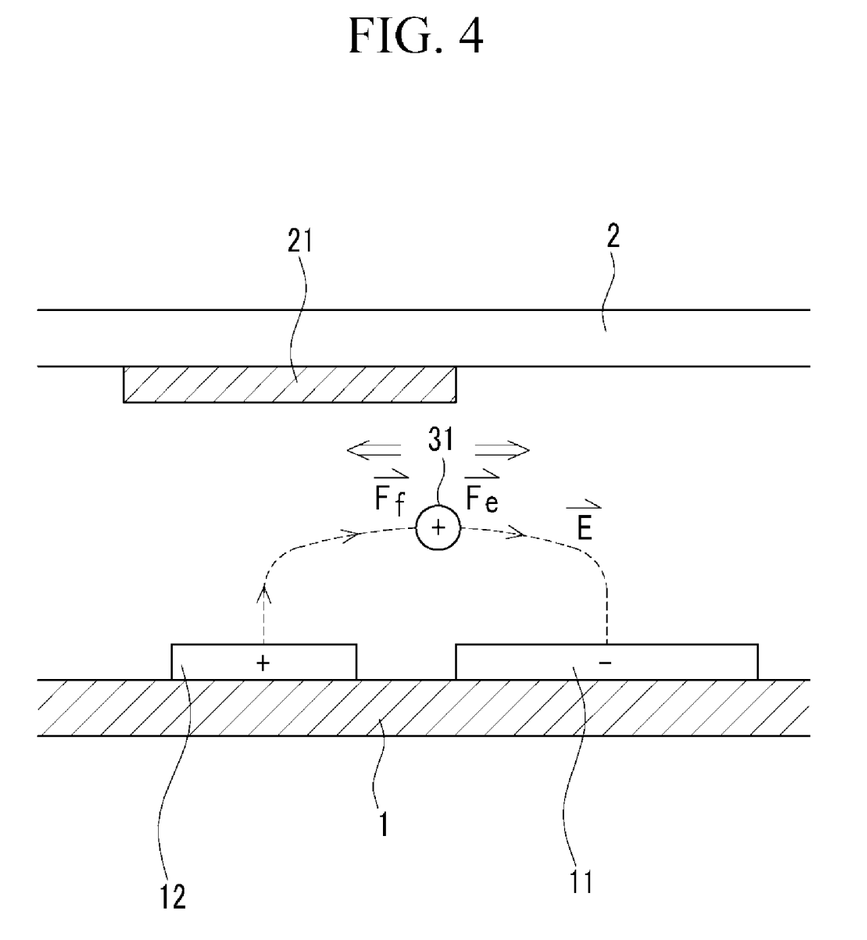

In FIG. 4, an electric voltage of the hidden electrode 12 is higher than that of the exposed electrode 11, and an electric field E is generated between the hidden electrode 12 and the exposed electrode 11. The electric field E includes a strong horizontal gradient, and in particular, the horizontal gradient is dominant in the central portion between the hidden electrode 12 and the exposed electrode 11. The electrophoretic particles 31, with charged positive polarity, are influenced by the electric force Fe of the electric field E, and if the electric force Fe is larger than the friction force Ff of the dispersion medium, the electrophoretic particles 31 move. When the electrophoretic particles 31 move and the electric field E is removed between the hidden electrode 12 and the exposed electrode 11 due to the removal of the voltage difference therebetween, motion of the electrophoretic particles 31 is stopped or slowed by the friction force Ff. Therefore, the electrophoretic particles 31 may be moved into a desired position relative to the hidden electrode 12 and the exposed electrode 11 by controlling an application time of the electric field E.

Figure 5:
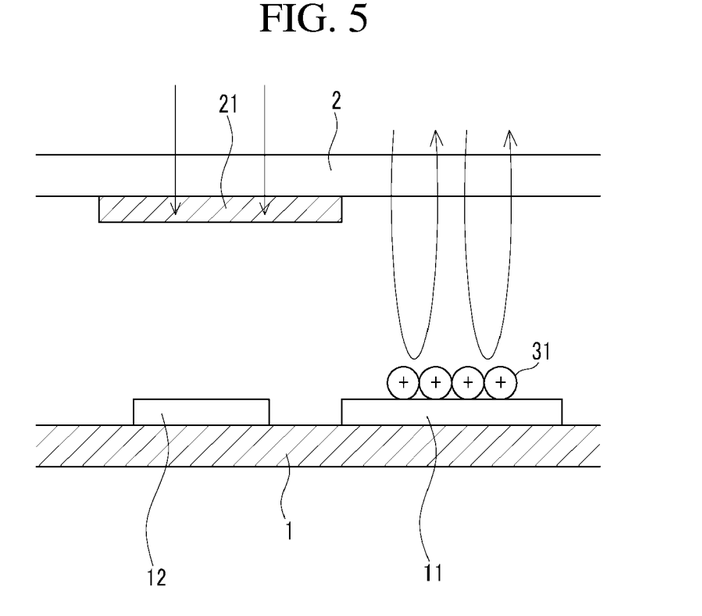

As shown in FIG. 5, if the electrophoretic particles 31 are all moved to the effective display area EA, light incident from the upper panel 20 is reflected by the electrophoretic particles 31 in the effective display area EA. A portion of light having a particular wavelength or wavelength range may be reflected, or all the light may be reflected according to the reflective characteristics of the electrophoretic particles 31.

Figure 6:
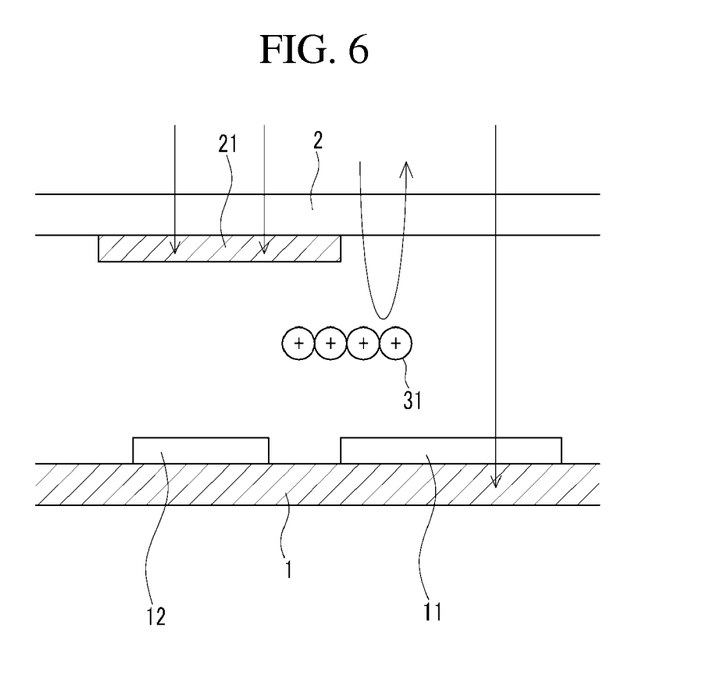

As shown in FIG. 6, when a portion of the electrophoretic particles 31 is disposed in the light blocking region BA, and the remaining portion is disposed in the effective display area EA, some light incident in the effective display area EA is reflected by the electrophoretic particles 31 and some light is absorbed by the substrate 1. In this way, an intermediate gray is displayed, and an image may be displayed by controlling the density of the electrophoretic particles 31 disposed in the effective display area EA.

Figure 7:
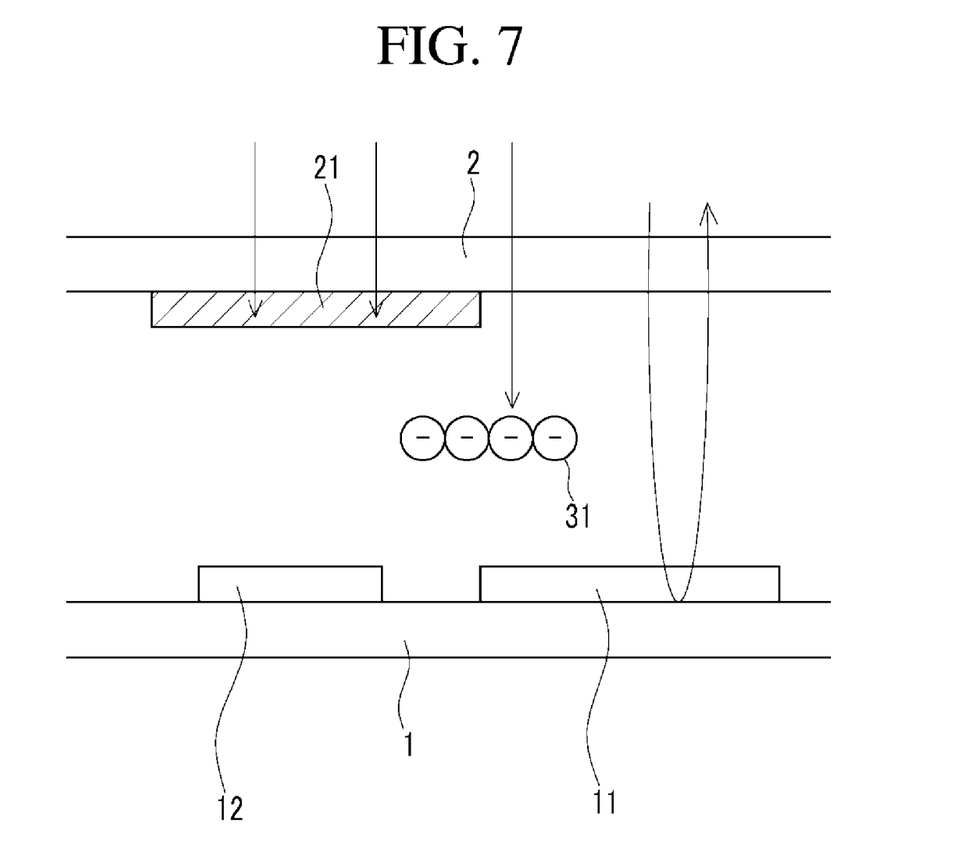

Conversely, if the lower substrate 1 has reflective characteristics and the electrophoretic particles 31 have a light blocking or light absorbing property, the explanation of FIG. 3, FIG. 4, FIG. 5, and FIG. 6 is reversed. For example, as shown in FIG. 7, when a portion of the electrophoretic particles 31 is disposed in the light blocking region BA and the remaining portion is disposed in the effective display area EA, some light incident to the effective display area EA is absorbed by the electrophoretic particles 31 and some light incident to the effective display area EA is reflected by the substrate 1 such that an intermediate gray is displayed.

In this way, a desired image with varying degrees of grayscales may be displayed using a single-polarity electrophoretic particle system. When using the single-polarity electrophoretic particle system, the total density of the electrophoretic particles 31 may be increased such that color reproducibility is improved. Furthermore, collisions generated between the electrophoretic particles 31 may be remarkably decreased as compared to conventional systems including electrophoretic particles with reversed polarities. Thus, response time may increase.

Next, an electrophoretic display according to exemplary embodiments of the present invention will be described in detail with reference to FIG. 8, FIG. 9, and FIG. 10.

Figure 8:
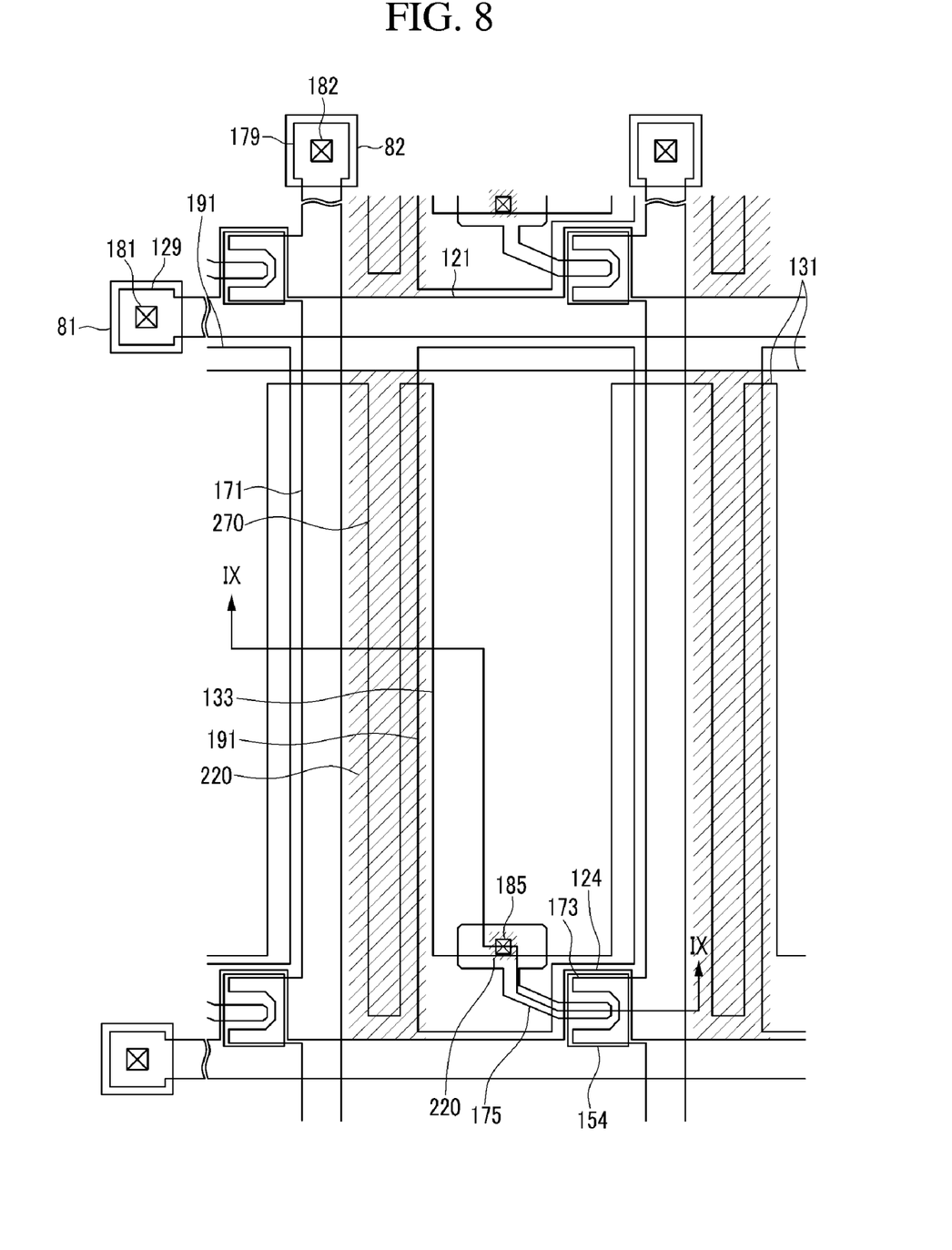
FIG. 8 is a plan view showing an electrophoretic display according to another exemplary embodiment of the present invention.
Figure 9:
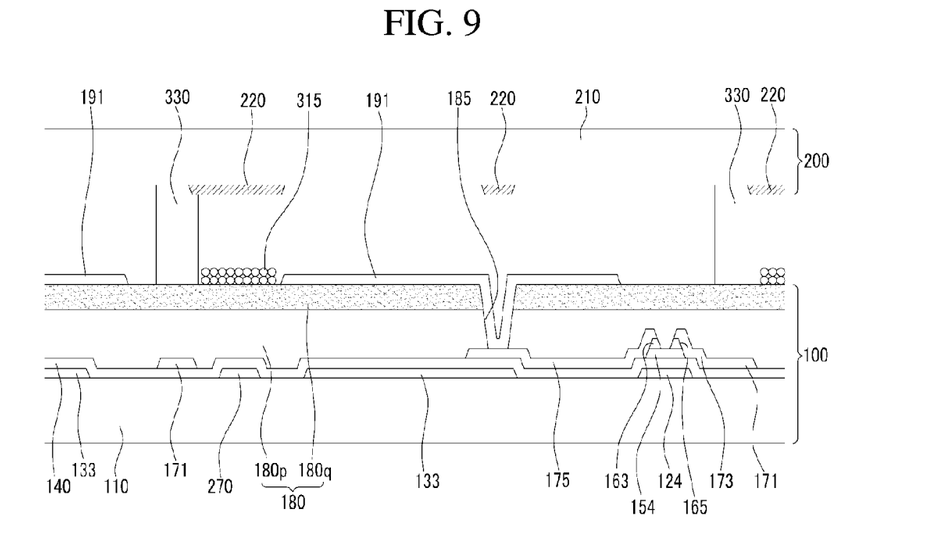
FIG. 9 is a cross-section view of the electrophoretic display illustrated in FIG. 8 taken along line IX-IX according to an exemplary embodiment of the present invention.
Figure 10:
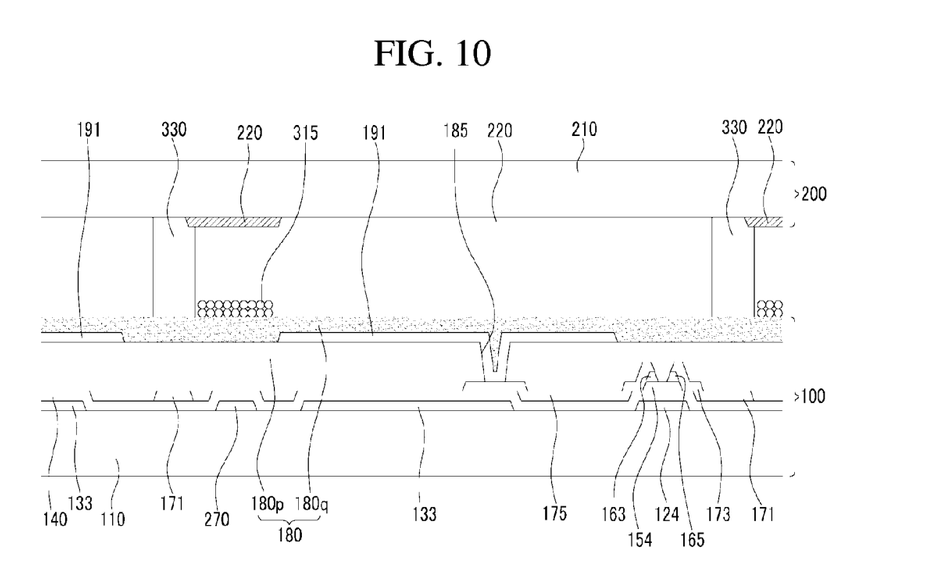
FIG. 10 is a cross-section view of the electrophoretic display illustrated in FIG. 8 taken along line IX-IX according to another exemplary embodiment of the present invention.

FIG. 8 is a plan view showing an electrophoretic display according to another exemplary embodiment of the present invention, FIG. 9 is a cross-section view of the electrophoretic display illustrated in FIG. 8 taken along line IX-IX according to an exemplary embodiment of the present invention, and FIG. 10 is a cross-section view of the electrophoretic display illustrated in FIG. 8 taken along line IX-IX according to another exemplary embodiment of the present invention.

Referring to FIG. 8, FIG. 9, and FIG. 10, electrophoretic displays according to exemplary embodiments include a lower panel 100, an upper panel 200, partitions 330, and electrophoretic particles 315.

First, the lower panel 100 will be described in detail.

A gate conductor including gate lines 121 and storage electrode lines 131 is arranged on a substrate 110, which may be a flexible insulating material such as plastic.

The gate lines 121 transmit a gate signal, and each gate line 121 includes gate electrodes 124 and an end portion 129 having a large area for connecting to another layer or a driving circuit.

The storage electrode lines 131 receive a voltage and include a stem line extending substantially in a horizontal direction and parallel with the gate lines 121, and common electrodes 270 and storage electrodes 133 extending downward from the stem line. Each storage electrode line 131 is disposed between two neighboring gate lines 121, and is arranged close to the upper gate line 121 of the two neighboring gate lines 121. The width of the common electrodes 270 may be narrow relative to the width of the storage electrodes 133, and the common electrodes 270 and the storage electrodes 133 are alternately disposed. However, the common electrodes 270 and the storage electrodes 133 may have various shapes and arrangements.

A gate insulating layer 140, semiconductor islands 154, a pair of ohmic contact islands 163 and 165, data lines 171, source electrodes 173, and drain electrodes 175 are sequentially arranged on the gate lines 121 and storage electrode lines 131.

The semiconductor islands 154 may be hydrogenated amorphous silicon or polysilicon, and the ohmic contact islands 163 and 165 may be amorphous silicon doped with a high concentration of an impurity, polysilicon, or silicide. The ohmic contact islands 163 and 165 are disposed in pairs on the semiconductor islands 154.

The data lines 171 transmit a data signal, and each data line 171 includes source electrodes 173 extending from the data lines 171 to the gate electrodes 124 and an end portion 179 having a large area for connecting to another layer or a driving circuit. One common electrode 270 and one storage electrode 133 are disposed between two adjacent data lines 171. The drain electrodes 175 are spaced apart from the data lines 171, and are disposed opposite the source electrodes 173 with respect to the gate electrodes 124. Each drain electrode 175 may include a wide end portion and a narrow end portion.

A gate electrode 124, a source electrode 173, and a drain electrode 175, along with a semiconductor island 154, are components of a thin film transistor (TFT) having a channel arranged between the source electrode 173 and the drain electrode 175 in the semiconductor island 154.

The ohmic contact islands 163 and 165 are interposed between underlying semiconductor islands 154 and the overlying source electrodes 173 and drain electrodes 175, respectively, and reduce the contact resistance therebetween. The semiconductor islands 154 include exposed portions, which are not covered with the source electrodes 173 or the drain electrodes 175, such as portions located between the source electrodes 173 and the drain electrodes 175.

A passivation layer 180 is arranged on the exposed semiconductor islands 154, the data lines 171, the drain electrodes 175, and gate insulating layer 140. The passivation layer 180 may include a lower layer 180p and an upper layer 180q. The lower layer 180p may be made of an inorganic insulator such as silicon nitride and silicon oxide. The upper layer 180q may be made of an organic insulator, such as a black material, as a color display layer in the present exemplary embodiment. The dielectric constant of the organic insulator may be equal to or less than 4.0. The passivation layer 180 may have a single-layered structure made of an inorganic insulator, or an organic insulator such as a black material.

The passivation layer 180 has contact holes 185 and 182 to expose the wide end portions of the drain electrodes 175 and the end portions 179 of the data lines 171, respectively, and the passivation layer 180 and the gate insulating layer 140 have contact holes 181 to expose the end portions 129 of the gate lines 121.

Referring to FIG. 8 and FIG. 9, pixel electrodes 191 and contact assistants 81 and 82 are arranged on the upper layer 180q. They may be made of a transparent conductor such as Indium Tin Oxide (ITO) or Indium Zinc Oxide (IZO).

However, the pixel electrodes 191 may be disposed between the lower layer 180p and the upper layer 180q, as shown in FIG. 10. In this case, the pixel electrodes 191 may be made of an opaque material and the upper layer 180q may not have the contact holes 185.

The pixel electrodes 191 overlap the storage electrodes 133 but do not overlap the common electrodes 270. The pixel electrodes 191 are connected to the drain electrodes 175 through the contact holes 185 such that the pixel electrodes 191 receive data signals from the drain electrodes 175. The data signals may be a voltage having a level corresponding to an image to be displayed.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance adhesion between the end portions 129 and 179 and another layer or an external driving circuit.

Next, the upper panel 200 will be described in detail.

A light blocking member 220 is arranged on a flexible substrate 210 made of a flexible insulating material such as plastic. The light blocking member 220 overlaps the common electrode 270, and blocks or absorbs the light incident from outside. However, because the upper layer 180q has a black color and covers a portion where the light may be reflected by the signal lines, such as the gate lines 121 and data lines 171, and the thin film transistors, the light blocking member 220 may be designed to hide the common electrodes 270 on which the electrophoretic particles 315 are arranged. Accordingly, the aperture ratio of the display device may be improved.

In FIG. 9, the light blocking member 220 includes portions disposed over the contact holes 185 for preventing light leakage due to the drain electrodes 175 and the passivation layer 180 on the circumference of the contact holes 185. On the other hand, in FIG. 10, the upper layer 180q covers the contact holes 185 so a light blocking member 220 disposed over the contact holes 185 may not be necessary. Therefore, the aperture ratio of the exemplary embodiment shown in FIG. 10 may be larger than that of the exemplary embodiment shown in FIG. 9.

The electrophoretic particles 315 are disposed in the gap between the lower panel 100 and the upper panel 200, and divided by the partitions 330. The partitions 330 may be fixed on the passivation layer 180, and are close to or contacting the upper panel 200.

The electrophoretic particles 315 may display one color of red, green, blue, yellow, magenta, cyan, and white, and may be reflective.

The electrophoretic particles 315 may have the same electric polarity, and may be disposed by dispersion in the dispersion medium using an inkjet printing method at the correct positions according to color.

An electrophoretic display according to exemplary embodiments of the present invention will now be described in detail with the reference to FIG. 11, FIG. 12, and FIG. 13.

Figure 11:
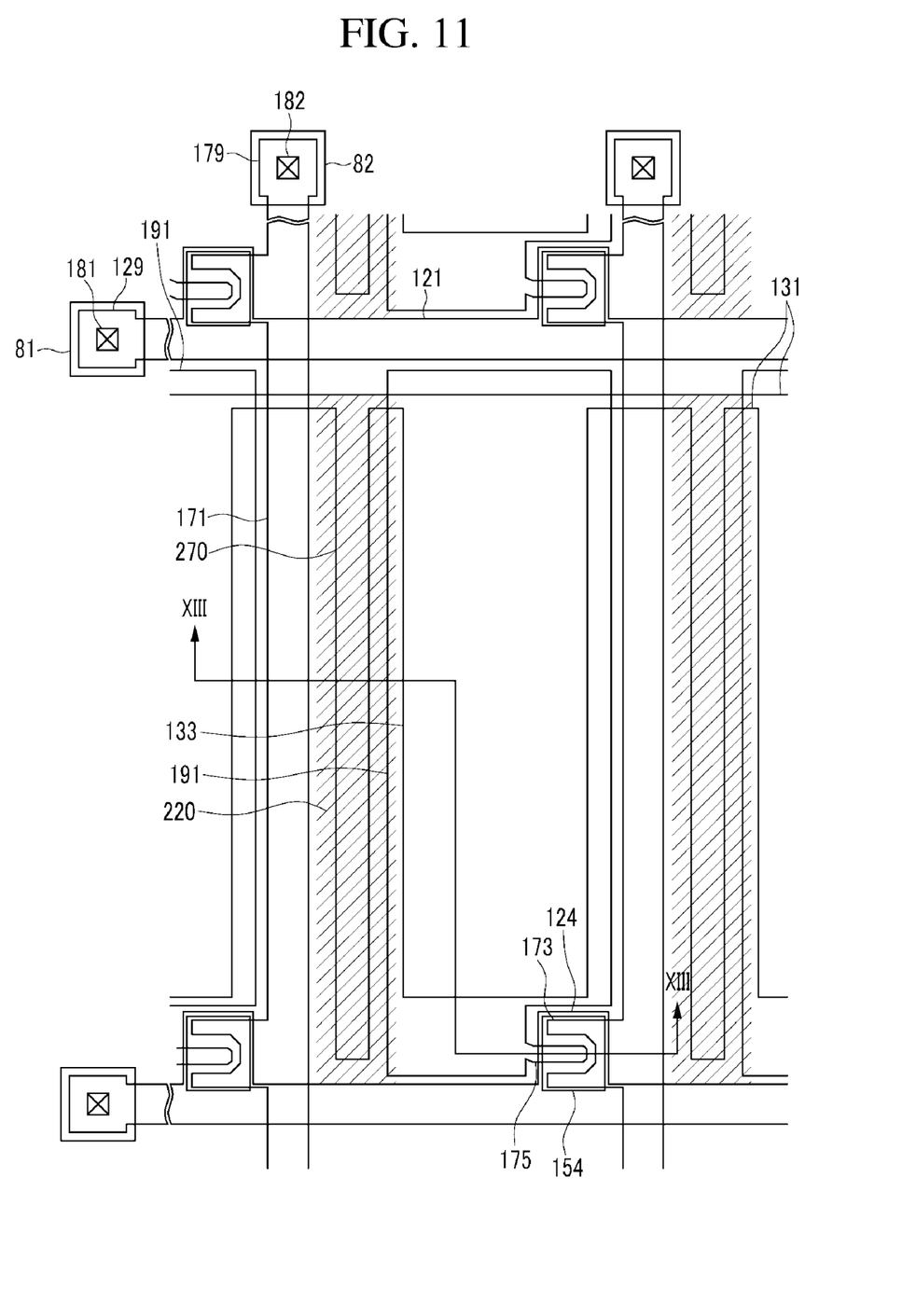
FIG. 11 is a plan view showing an electrophoretic display according to another exemplary embodiment of the present invention.
Figure 12:
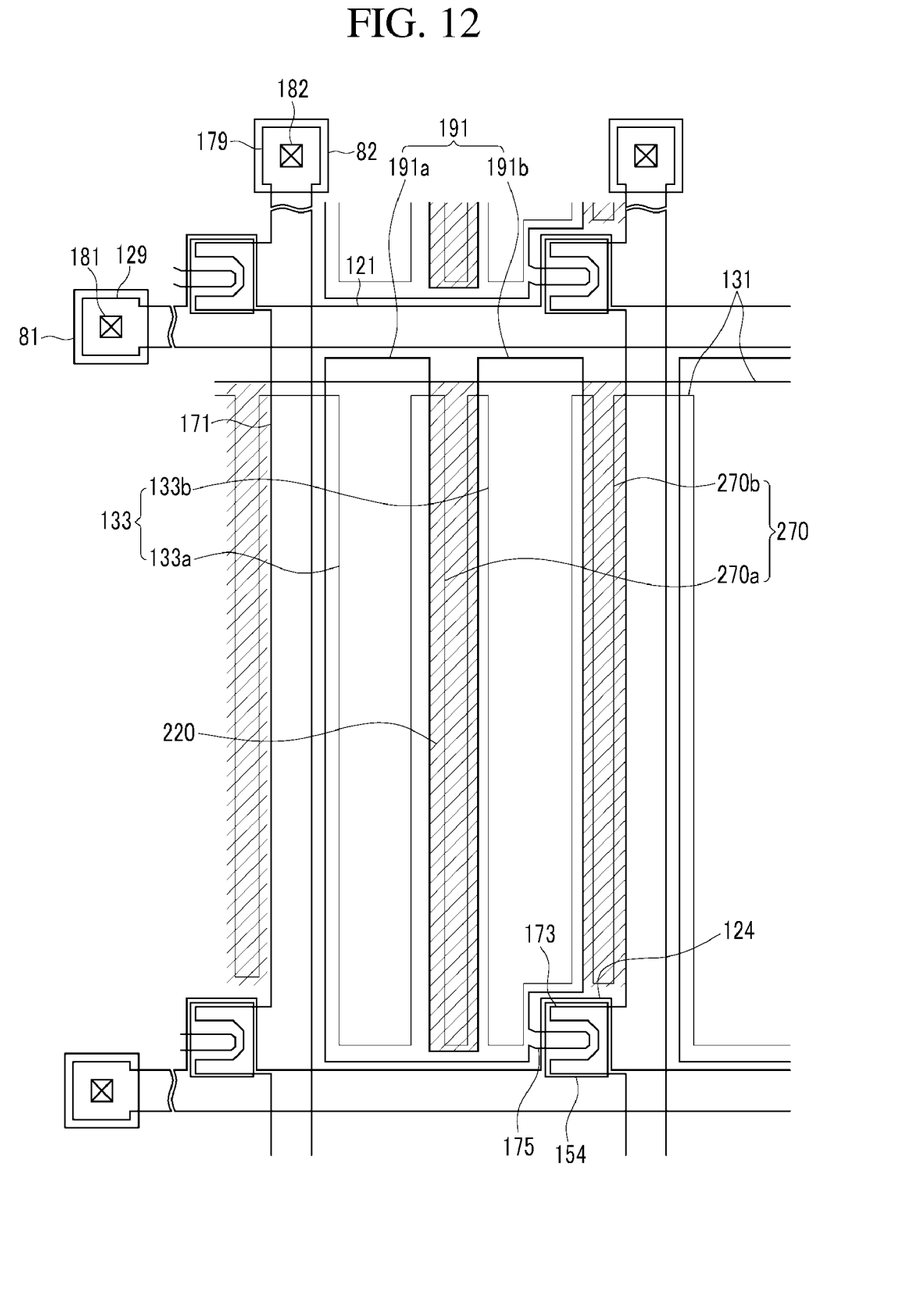
FIG. 12 is a plan view showing an electrophoretic display according to another exemplary embodiment of the present invention.
Figure 13:
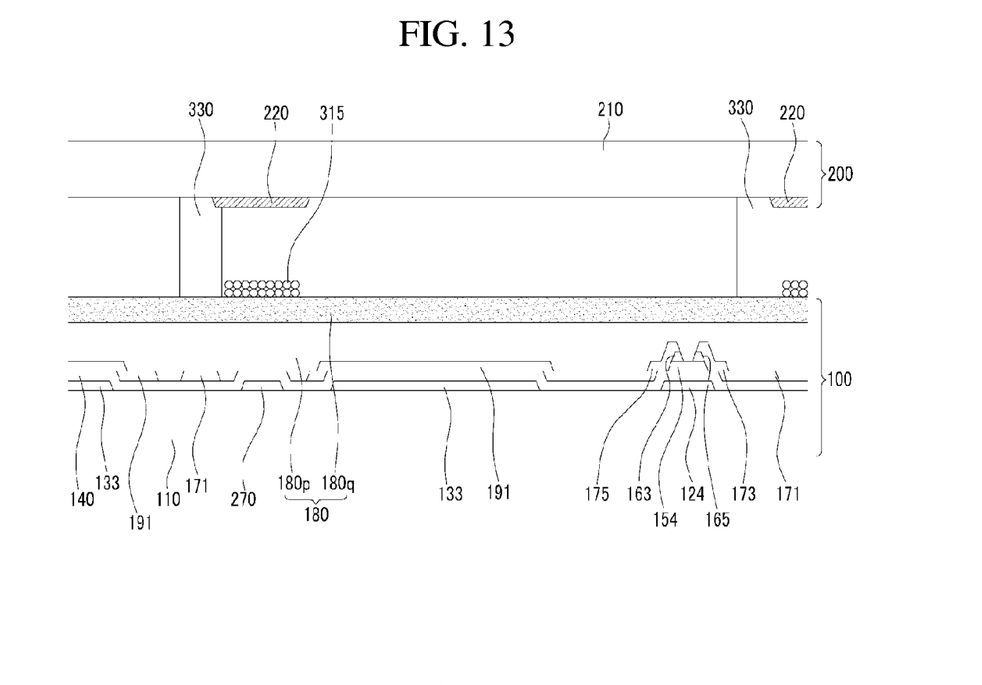
FIG. 13 is a cross-section view of the electrophoretic display illustrated in FIG. 11 taken along line XIII-XIII.

FIG. 11 and FIG. 12 are plan views showing electrophoretic displays according to further exemplary embodiments of the present invention, and FIG. 13 is a cross-section view of the electrophoretic display illustrated in FIG. 11 taken along line XIII-XIII.

Referring to FIG. 11, FIG. 12, and FIG. 13, electrophoretic displays according to other exemplary embodiments of the present invention include a lower panel 100, an upper panel 200, partitions 330, and electrophoretic particles 315.

The layered structures of the lower panel 100 and the upper panel 200 according to the present exemplary embodiment may be the same as or substantially similar to those described according to the exemplary embodiments shown in FIG. 8, FIG. 9, and FIG. 10. Accordingly, description of FIG. 11, FIG. 12, and FIG. 13 will be focused on the differences therein.

In FIG. 11, FIG. 12, and FIG. 13, the drain electrodes 175 extend to form pixel electrodes 191.

Thus, an additional deposition step and a photolithography step for forming the pixel electrodes 191 on a different layer than the drain electrode 175, and a step for forming the contact holes 185 for connecting the drain electrodes 175 to the pixel electrodes 191 may be excluded. Therefore, light blocking members 220 corresponding to contact holes 185 for preventing light leakage may be excluded. Accordingly, the aperture ratio of the electrophoretic display according to the present exemplary embodiments may be improved.

Furthermore, as shown in FIG. 12, the pixel electrodes 191 may include two pixel branch electrodes 191a and 191b, and the common electrodes 270 may include two common branch electrodes 270a and 270b arranged between two neighboring data lines 171. Two pixel branch electrodes 191a and 191b and two common branch electrodes 270a and 270b may be alternately arranged. The storage electrodes 133 may include two storage branch electrodes 133a and 133b, which may be disposed with a shape that is the same as or substantially similar to the shape of the pixel branch electrodes 191a and 191b. The light blocking member 220 may be disposed with a shape that is the same as or substantially similar to the shape of the common branch electrodes 270a and 270b.

The various characteristics described in the exemplary embodiments shown in FIG. 8, FIG. 9, and FIG. 10 may be adapted to the present exemplary embodiments.

Next, an electrophoretic display according to exemplary embodiments of the present invention will be described in detail with reference to FIG. 14, FIG. 15, and FIG. 16.

Figure 14:
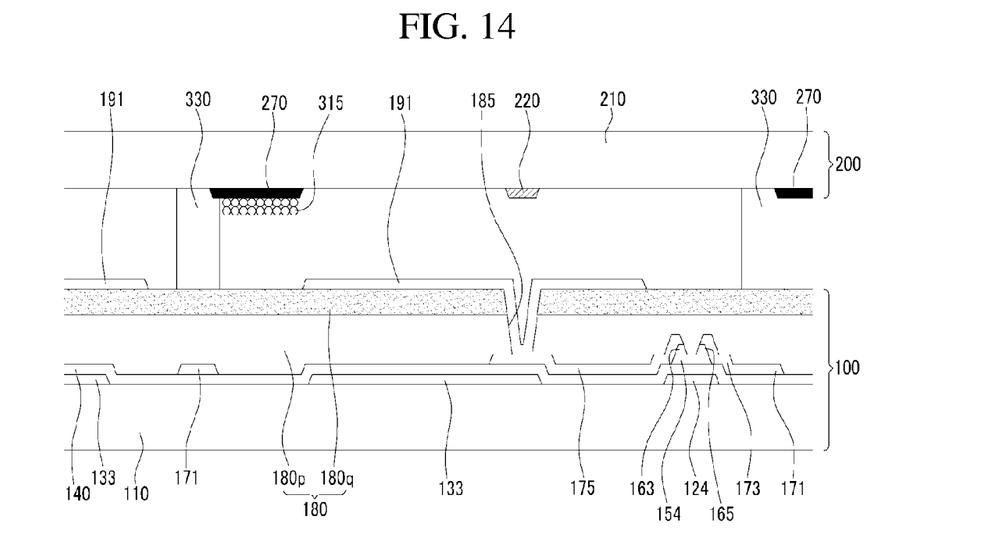
FIG. 14 is a cross-sectional view of an electrophoretic display according to another exemplary embodiment of the present invention.
Figure 15:
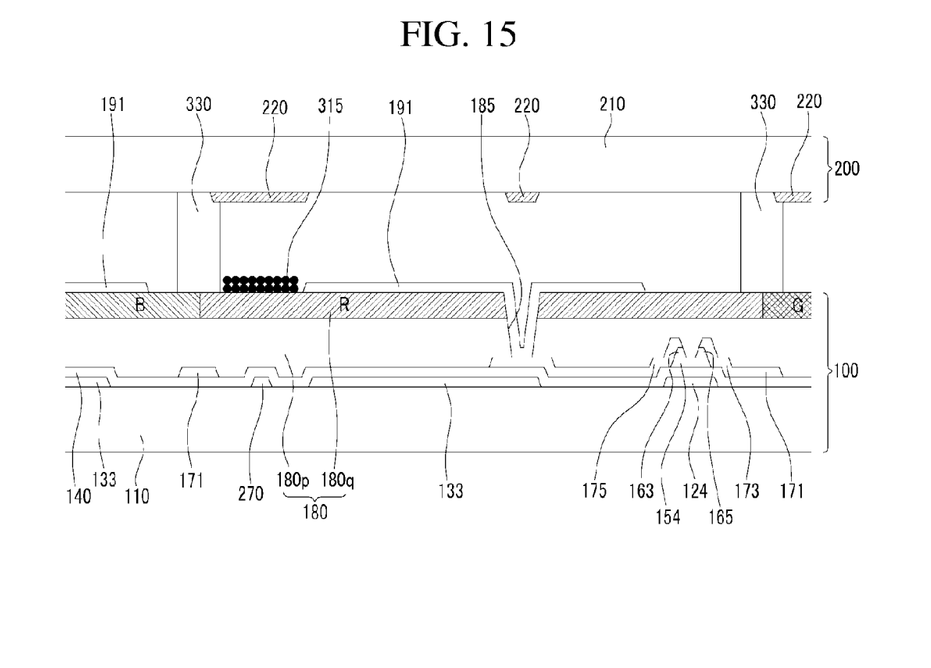
FIG. 15 is a cross-sectional view of an electrophoretic display according to another exemplary embodiment of the present invention.
Figure 16:
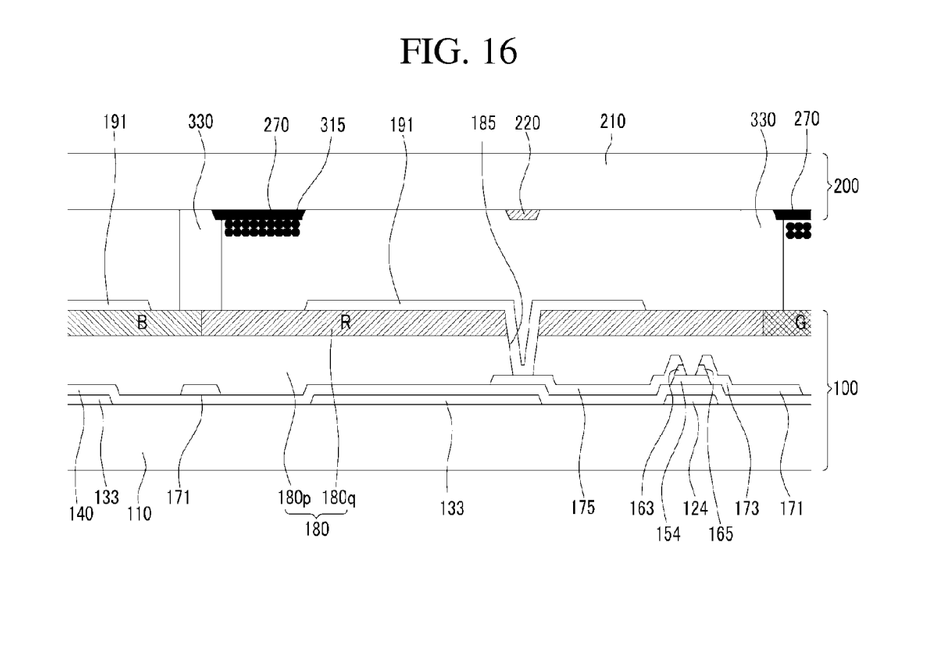
FIG. 16 is a cross-sectional view of an electrophoretic display according to another exemplary embodiment of the present invention.

FIG. 14, FIG. 15, and FIG. 16 are cross-section views showing electrophoretic displays according to additional exemplary embodiments of the present invention, and the additional exemplary embodiments of the present invention may have the same or substantially similar plan view structure as that shown in FIG. 8.

Referring to FIG. 14, FIG. 15, and FIG. 16, the electrophoretic displays according to these exemplary embodiments include a lower panel 100, an upper panel 200, partitions 330, and electrophoretic particles 315.

The layered structures of the lower panel 100 according to the present exemplary embodiments may be the same as or substantially similar to those described according to the exemplary embodiments shown in FIG. 8, FIG. 9, and FIG. 10. Accordingly, description of FIG. 13, FIG. 14, and FIG. 15 will be focused on the differences therein.

In the electrophoretic display shown in FIG. 14, common electrodes 270 include a light blocking material and are arranged on a substrate 210 of the upper panel 200, rather than on the lower panel 100. The common electrodes 270 are black, and occupy a region corresponding to a region where the light blocking member 220 is disposed in FIG. 9. Thus, these common electrodes 270 may be used as electric field generating electrodes, as well as light blocking members.

In the electrophoretic displays shown in FIG. 15 and FIG. 16, the upper layer 180q is reflective rather than light blocking. Thus, the electrophoretic particles 315 block or absorb light.

The upper layer 180q may reflect light within a particularly specified wavelength or wavelength range, and display a color. The upper layer 180q may represent a primary color such as red, green, and blue. Therefore, the upper layer 180q may be a reflective color filter. The diameter of the pigments included in the upper layer 180q as a reflective color filter may be larger than half the wavelength of the light reflected by the upper layer 180q, and more particularly in the range of about 400 nm to about 800 nm.

Because the electrophoretic particles 315 are black and a light color corresponding to a moving space between partitions 330 is achieved by the upper layer 180q rather than the electrophoretic particles 315, division according to position and/or color of the electrophoretic particles 315 may not be necessary. Accordingly, simple methods, such as spin coating, slit coating, and drip dispensing, may be used to form the electrophoretic particles 315. Therefore, the manufacturing time of the present exemplary embodiments may be reduced in comparison with the previous exemplary embodiments.

In this way, the exemplary embodiments of the electrophoretic display including the reflective upper layer 180q and the light blocking electrophoretic particles 315 may be adapted to the electrophoretic displays of FIG. 8, FIG. 9, FIG. 10, FIG. 11, FIG. 12, FIG. 13, and FIG. 14. FIG. 15 and FIG. 16 show exemplary embodiments of such displays, with the cross-section view of an electrophoretic display shown in FIG. 15 being substantially similar to that of FIG. 9, and the cross-sectional view of an electrophoretic display shown in FIG. 16 being substantially similar to that of FIG. 14.

As above described, the electrophoretic active layer is a single-polarity electrophoretic particle system in which only single-polarity electrophoretic particles exist such that response speed and color reproducibility may be improved in the exemplary embodiment of the present invention.

Furthermore, the lower panel may include an organic insulating layer with black color such that the region occupied by the light blocking member of the upper panel may be decreased, thereby improving aperture ratio of the display device.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrophoretic display, comprising:
   a first substrate;
   a second substrate facing the first substrate;
   a first electrode arranged on the first substrate;
   a second electrode arranged on the first substrate;
   a storage electrode arranged on the first substrate, the storage electrode overlapping with the first electrode;
   an electrophoretic active layer comprising electrophoretic particles and a dispersion medium, the electrophoretic particles being arranged between the first substrate and the second substrate; and
   a light blocking member arranged on the second substrate and disposed opposite to the second electrode,
   wherein the electrophoretic active layer is a single-polarity electrophoretic particle system.

2. The electrophoretic display of claim 1, further comprising a reflective layer arranged between the first electrode and the first substrate.

3. The electrophoretic display of claim 2, wherein the first electrode electrically connects to a thin film transistor through a contact hole,
   wherein the thin film transistor comprises a gate electrode, a source electrode, and a drain electrode and arranged on the first substrate.

4. The electrophoretic display of claim 2, wherein the reflective layer is a color layer reflecting a light having predetermined wavelength.

5. The electrophoretic display of claim 4, wherein the color layer represents a color selected from the group consisting of red, green, blue, yellow, magenta, cyan, black, and white.

6. The electrophoretic display of claim 1, wherein the electrophoretic particles represent a color selected from the group consisting of black, and white.

7. The electrophoretic display of claim 1, wherein the first electrode is arranged on the reflective layer.

8. The electrophoretic display of claim 1, further comprising:
   a partition arranged between the first substrate and the second substrate and defining a moving space of the electrophoretic particles.

9. The electrophoretic display of claim 1, wherein the second electrode is arranged on the first substrate, and is on a different layer than the first electrode.

10. The electrophoretic display of claim 1, wherein the second electrode and the storage electrode are arranged on the same layer.

* * * * *